United States Patent

[11] 3,628,118

[72] Inventors Peter Michael Knight;
Michael John Tooze, both of Kent, England
[21] Appl. No. 864,411
[22] Filed Oct. 7, 1969
[45] Patented Dec. 14, 1971
[73] Assignee Elliott Brothers (London) Limited
London, England
[32] Priority Oct. 9, 1968
[33] Great Britain
[31] 47,813/68

[54] ELECTRICAL CIRCUITRY FOR USE E.G. IN FORCE BALANCE SERVOSYSTEMS
4 Claims, 5 Drawing Figs.

[52] U.S. Cl. .................................................. 318/676, 318/599
[51] Int. Cl. .......................................................... G05b 11/01
[50] Field of Search ............................................ 318/599, 676

[56] References Cited
UNITED STATES PATENTS
2,985,808  5/1961  Ketchledge .................. 318/20.290 UX
3,213,694  10/1965  Clark et al. ..................... 318/32 X Primary Examiner—T. E. Lynch
Attorney—Kirschstein, Kirschstein, Ottinger & Frank ABSTRACT: The invention is concerned with electrical circuitry for ensuring that the mean current through a load, e.g. a force balance winding for a pressure transducer, bears a substantially linear relationship to the mark/space ratio of pulse width modulated signals whose mark/space ratio varies e.g. with an error signal developed at a pickoff of the pressure transducer.

The circuitry comprises an integrator, a load, e.g. the aforementioned winding, a current-sensing resistor in series with the load, a switch which connects the load to the said circuit means or to circuit earth, a source of the aforementioned p.w.m. signals, means for operating the switch to connect the load to the said circuit means or to circuit earth accordingly as the p.w.m. signals are at one voltage level or the other, and a comparator which receives the p.w.m. signals and the voltage at the junction between the load and the current-sensing resistor and which supplies to the integrator a voltage which represents the difference between the p.w.m. signals and the junction voltage.

The time constant of the integrator is chosen in relation to the cycle time of the p.w.m. signals so as to ensure that variation in load current, arising, e.g. as a result of temperature variations, gives rise to a voltage change at the output of the integrator such change ensuring that the mean load current bears the aforestated relationship to the mark/space ratio of the p.w.m. signals.

INVENTORS
PETER M. KNIGHT
MICHAEL J. TOOZE

BY Kirchstein, Kirchstein, Ottinger & Frank
ATTORNEYS

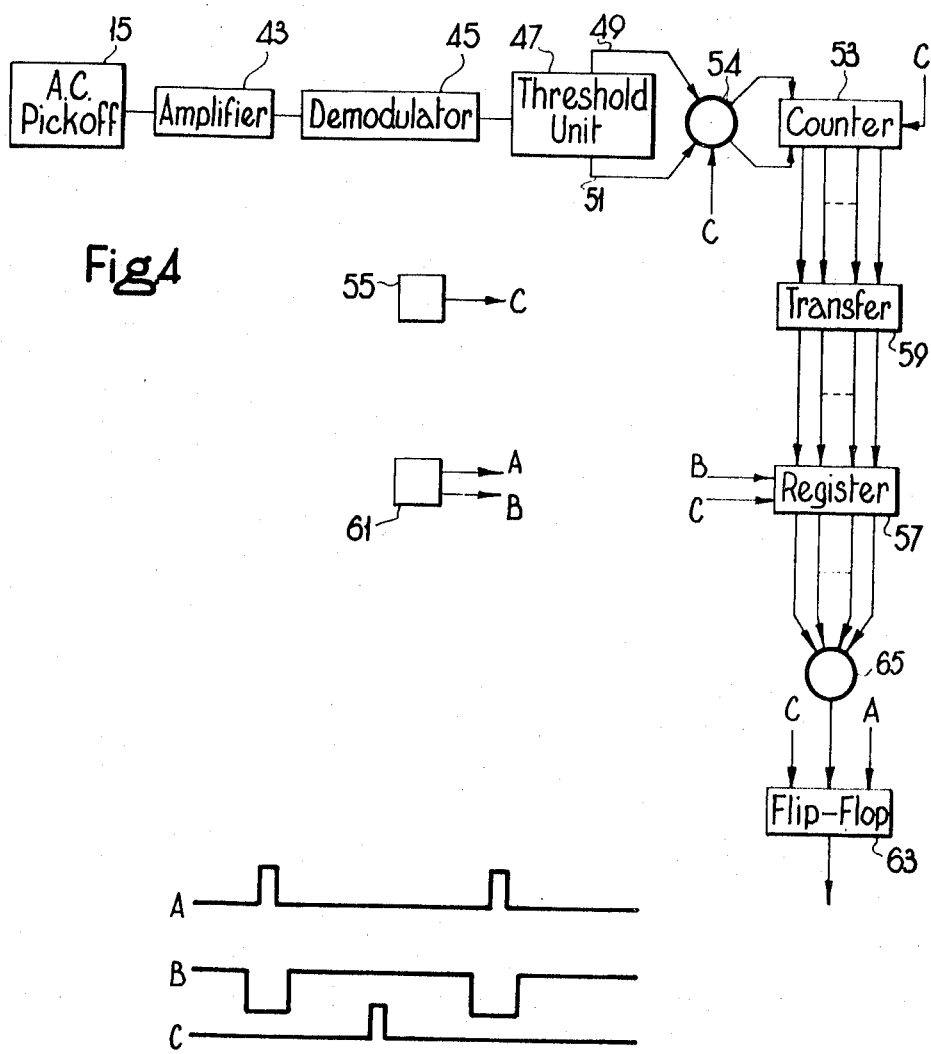

ELECTRICAL CIRCUITRY FOR USE E.G. IN FORCE BALANCE SERVOSYSTEMS

This invention relates to electrical circuitry for use, e.g. in force balance systems.

Circuitry according to the invention comprises:

circuit means operable to develop an output voltage which is the time integral of a variable voltage with respect to a certain datum voltage;

a load;

current-sensing means in series with the load;

a switch which, in one position, connects the load to the output of the said circuit means and, in another position, connects the load to a source of reference potential e.g. circuit earth;

a source of pulse width modulated (p.w.m.) signals;

means for operating the switch so as to connect the load to the output of the circuit means or the said source of reference voltage accordingly as the p.w.m. signals are at one voltage level or another; and comparator means to which are applied the pulse width modulated signals and the voltage developed at the junction between the load and the current-sensing means, and which supplies to the input of the said circuit means, a voltage representing the difference between the p.w.m. signals and the junction voltage; and the time constant of the circuit means is chosen in relation to the cycle time of the p.w.m. signals so that variations in load current due to drift or other variations in load characteristics, e.g. as a result of temperature variations, give rise to a change in voltage at the output of said circuit means, so as to ensure that the mean load current bears a substantially linear relationship to the mark/space ratio of the p.w.m. signals.

The source of p.w.m. signals may operate between predetermined reference voltage levels.

In an hereinafter described embodiment the source of p.w.m. signals comprises:

another switch connected to the comparator;

second and third reference voltage sources, one of which may be circuit earth; and a source of primary p.w.m. signals which is operative to connect the said other switch to the second or third reference voltage source accordingly as the primary p.w.m. signals are at one voltage or another, and which is operative, also, to operate the first mentioned switch so as to connect the load to the output of the said circuit means or the first mentioned source of reference voltage.

According to the invention, also, a force balance system comprises: circuitry as specified in the last preceding paragraph; a force balance transducer which is to be maintained against a reaction, at a null position as represented by the development of a null signal at the output of the transducer pickoff, by current flow in an electrical winding which constitutes the load for the said circuitry; and a circuit arrangement, constituting the said source of primary p.w.m. signals which are controlled as to mark/space ratio by error signals developed at the pickoff output.

The circuit means may comprise: an integrator the output of which is connected to the first mentioned switch and the input of which is connected to the comparator output.

The circuit means may comprise: an integrator whose output is connected to the comparator output; a voltage source operative to develop a substantially constant datum voltage; and voltage summing means which receives the datum voltage and the output voltage from the integrator and whose output is connected to the first-mentioned switch.

The invention is hereinafter described with reference to the accompanying drawings in which:

FIG. 4 is a more specific block schematic circuit diagram of a source of primary p.w.m. signals, and FIG. 5 depicts waveforms utilized in the force balance system.

Figure 1:
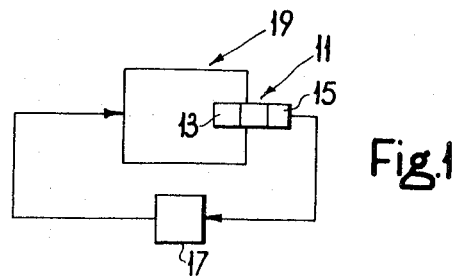
FIG. 1 is a block schematic diagram of a force balance pressure transducer system for an aircraft.

The system (FIG. 1) comprises: a force balance pressure transducer, static or pitot-static, 11 which has an electrical winding 13 and an AC pickoff 15; there is a source of primary pulse width modulated signals 17 which receives error signals developed at the pickoff output; and electrical circuitry 19, which may be considered to include the winding 13, receives pulse width modulated signals from the source 17 and develops in the winding 13 a DC current, the mean value of which bears a linear relationship to the mark/space ratio of the p.w.m. signals.

The force balance pressure transducer may be as described in U.K. Patent specification No. 1,215,141.

The circuitry 19 (FIG. 2) comprises circuit means 21 operable to develop an output voltage V which is the time integral of a variable voltage which, in practice, is applied to the input of the circuit means, with respect to a certain datum voltage $V_m$; the winding 13 of the force balance transducer; current sensing means, in the form of a resistor 23, in series with the winding 13; a switch 25 which, in one position, connects the winding 13 to the output of the circuit means 21 and, in another position, connects the winding 13 to a source of reference voltage which, as shown, may be circuit earth; a source (27 and FIG. 4) of p.w.m. signals S; means, 29 and FIG. 4, for operating the switch 25 so as to connect the winding 13 to the output of the circuit means 21 or to circuit earth accordingly as the p.w.m. signals are at one voltage level or another; and comparator means 31 to which are applied the p.w.m. signals S and the voltage $V_{FB}$ developed at the junction 33 between the winding 13 and the resistor 23 and which applies to the input of the circuit means 21 a voltage representing the difference between the p.w.m. signals S and the junction voltage $V_{FB}$.

The time constant T of the circuit means 21 is chosen in relation to the cycle time of the p.w.m. signals S so that variations in the characteristics of the winding 13 due to drift or other variations, e.g. as a result of temperature changes, give rise to a change in the voltage V at the output of the circuit means 21, so as to ensure that the mean current in the winding 13, bears a substantially linear relationship to the mark/space ratio $\lambda$ of the p.w.m. signals S.

The circuit means 21 may, as shown, comprise an integrator 35 a source 37 of signals $V_m$, and a summing point 39. The voltage source 37 and the summing point 39 may, however, be omitted and the datum voltage would then be zero. In the absence of the voltage $V_m$ the integrator would have to integrate up to the mean voltage $V_m$ from its zero datum.

The source 27 of p.w.m. signals S comprises the source 17 (FIGS. 2 and 4) of primary p.w.m. signals P; reference voltage sources $V_R$ and earth and another switch 41. The switch 41 connects the comparator 31 to the reference voltage $V_R$ or to earth accordingly as the primary p.w.m. signals from the source 39 are at one voltage level or another. The p.w.m. signals S supplied to the comparator therefore have the mark/space ratio of the primary p.w.m. signals and a voltage which stands at one or the other of two precisely defined values, $V_R$ or earth.

The source 17 of primary p.w.m. signals is also connected to the actuating means 29 of the switch so that the switch 25 is operated synchronously with the switch 41.

In operation, the operation of the switch 25 by the primary p.w.m. signals P applies to the winding 13 a p.w.m. waveform whose mark/space ratio $\lambda$ is equal to that of the primary p.w.m. waveform and whose voltage stands at V, the output voltage of the circuit means 21, or at earth potential. The current flowing in the winding 13 in response to the p.w.m. voltage applied by the switch has a mean value which bears a linear relationship to the mark/space ratio of the p.w.m.

signals. As the mark/space ratio λ varies so does the mean current in the winding 13.

The characteristics of the winding 13 are liable to variation as a result e.g. of temperature changes. Such variations are reflected as a change in mean load current and, hence, in a change in voltage $V_{FH}$ at the junction 33. The latter point is connected to an input of the comparator 31.

In steady state conditions, i.e. when there is no change in characteristics, there is no net output from the comparator and the voltage V from the circuit means 21 is unchanging. When, however, the voltage $V_{FH}$ changes, e.g. as a result of a temperature change, a difference signal is supplied from the comparator to the integrator of the circuit means 21. The result is a change in V, the output voltage of the circuit means. The change in V compensates for the change in characteristics of the winding, with the result that the mean load current level remains substantially unaffected by such changes.

Figure 3:
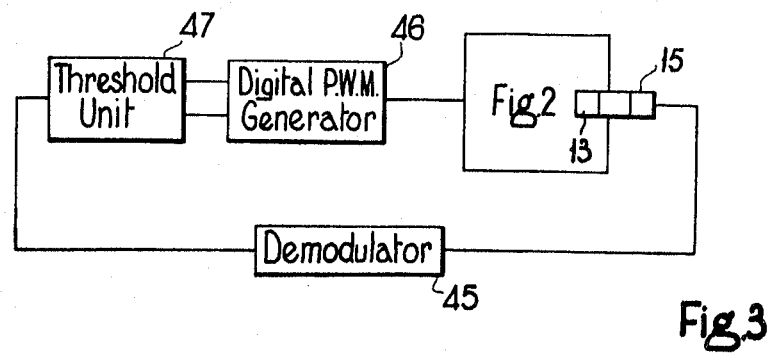
FIG. 3 is a general block schematic circuit diagram of a source of primary p.w.m. signals.

In broad terms the source 17 of primary p.w.m. signals comprises (FIG. 3): a demodulator 45, an error voltage sign threshold detector 47, and a digital p.w.m. generator 46 which receives signals from the threshold detector 47 on one or the other of two inputs accordingly as the p.w.m. waveform is to be increased or decreased as to mark/space ratio.

Typically, the source 17 (FIG. 4) of primary p.w.m. signals may comprise: an amplifier 43, demodulator 45, a voltage threshold arrangement 47 which develops an output signal on one 49 or the other 51 of two inputs accordingly as an analogue signal supplied from the demodulator 45 exceeds certain limits; an add/subtract digital counter 53; gating circuitry 54 controlled by clock pulses C (FIG. 5) from a clock pulse source 55 so as to supply to the add/subtract counter digital signals, derived signals appearing at the outputs of the threshold arrangement 47, so as to increment or decrement the content of the counter; a register 57, logic circuitry 59 controlled by recurrent signals A (FIG. 5) from a pulse generator 61 so as to periodically register in the register 57 the content of the counter 53 and a flip-flop 63 which is switched to one state by the recurrent signals A and reset by a pulse appearing at the output of a gate 65 when the content of the register 57 is reduced to zero by recurrent signals B (FIG. 5) from the pulse generator 61.

Figure 2:
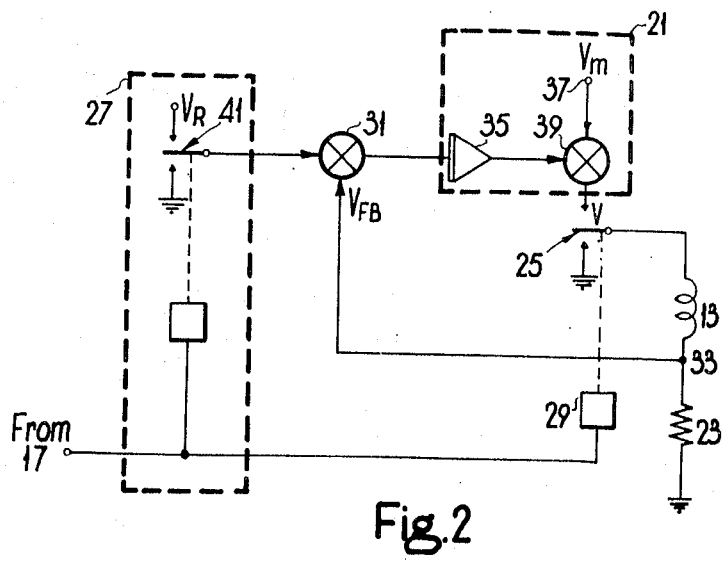
FIG. 2 depicts circuitry employed in producing controlled current flow in an electrical winding of the pressure transducer.

An analysis of the circuitry of FIG. 2 follows.
In the analysis:
$V_R$=reference voltage
λ=mark/space ratio of input p.w.m. waveform
T=time constant of integrator
V=integrator output voltage
$i$=current in winding 13
R=resistance of winding 13
L=inductance of winding 13
$R_s$=resistance of current sensing resistor
Note: $\tau$=average value of $i$ averaged over a few cycles of p.w.m. frequency.

Then, if T>> period of p.w.m., $$\lambda V_R - R_s \tau = sTV \quad (1)$$

$$\lambda V = (R + R_s + sL)\tau \quad (2)$$

Eliminating V from (1) and (2), $$\tau = \left[\frac{1}{1+\left(\frac{R+R_s}{R_s}\cdot\frac{T}{\lambda}\right)s + \frac{LT}{R_s\lambda}s^2}\right]\frac{V_R}{R_s}\lambda \quad (3)$$

$$\tau = \frac{\left(\frac{V_R\lambda}{LT}\right)}{s^2 + \left(\frac{R+R_s}{L}\right)s + \frac{R_s\lambda}{LT}} \quad (4)$$

and eliminating $\tau$ from (1) and (2), $$V = \frac{(R+R_s)V_R + LV_R s}{R_s + \frac{R+R_s}{\lambda}Ts + \frac{LT}{\lambda}s^2} \quad (5)$$

Hence it can be seen from (3) that $$\text{steady state } \tau = \frac{V_R}{R_s}\lambda$$

and from (4) that if $\tau$ is disturbed it returns to the true value of $\tau$ with $$\text{Damping factor} = \frac{R+R_s}{2}\sqrt{\frac{T}{LR_s\lambda}} \quad (6)$$

$$\text{Natural frequency} = \sqrt{\left(\frac{R_s\lambda}{LT}\right)} \quad (7)$$

Also, it can be seen from (5) that $$\text{steady state } V = \frac{R+R_s}{R_s}V_R$$

which is independent of λ.

Thus as λ varies the integrator output V will not be required to change once V has attained its correct value.

This means, therefore, that the average current $i$ through the winding 13 will always directly follow λ.

The only reason for V changing subsequently is to correct for changes in R and L arising from temperature variation which will be comparatively slow and hence the value of T can be chosen suitably.

We claim:
1. Electrical circuitry which comprises:
   circuit means operable to develop an output voltage which is the time integral of a variable voltage with respect to a certain datum voltage;
   a load;
   current-sensing means in series with the load;
   a switch which, in one position, connects the load to the output of the said circuit means and, in another position, connects the load to a source of reference potential e.g. circuit earth;
   a source of pulse width modulated (p.w.m.) signals;
   means for operating the switch so as to connect the load to the output of the circuit means or the said source of reference voltage accordingly as the p.w.m. signals are at one voltage level or another; and
   comparator means to which are applied the pulse width modulated signals and the voltage developed at the junction between the load and the current sensing means, and which supplies to the input of the said circuit means, a voltage representing the difference between the p.w.m. signals and the junction voltage; in which
   the circuit means comprises: an integrator whose output is connected to the comparator output; a voltage source operative to develop a substantially constant datum voltage; and voltage summing means which receives the datum voltage and the output voltage from the integrator and whose output is connected to the first mentioned switch; and in which
   the time constant of the circuit means is chosen in relation to the cycle time of the p.w.m. signals so that variations in load current due to drift or other variations in load characteristics, e.g. as a result of temperature variations, give rise to a change in voltage at the output of the said circuit means, so as to ensure that the mean load current bears a substantially linear relationship to the mark/space ratio of the p.w.m. signals.

2. Circuitry according to claim 1 in which the source of p.w.m. signals operates between predetermined reference voltage levels.

3. Circuitry according to claim 2 in which the source of p.w.m. signals comprises:
   another switch connected to the comparator;
   second and third reference voltage sources, one of which may be circuit earth; and a source of primary p.w.m. signals which is operative to connect the said other switch to the second or third reference voltage source accordingly as the primary p.w.m. signals are at one voltage or another, and which is operative, also, to operate the first mentioned switch so as to connect the load to the output of the said circuit means or the first mentioned source of reference voltage.

4. A force balance system which comprises: circuitry as claimed in claim 3; a force balance transducer which is to be maintained against a reaction, at a null position as represented by the development of a null signal at the output of the transducer pickoff, by current flow in an electrical winding which constitutes the load for the said circuitry; and a circuit arrangement, constituting the said source of primary p.w.m. signals which are controlled as to mark/space ratio by error signals developed at the pickoff output.

* * * * *